US010992627B2

(12) United States Patent
Cao

(10) Patent No.: US 10,992,627 B2
(45) Date of Patent: Apr. 27, 2021

(54) LOCATION RESTRICTED MESSAGE EXCHANGE SYSTEM

(71) Applicant: PAYPAL, INC., San Jose, CA (US)

(72) Inventor: Koson Cao, San Jose, CA (US)

(73) Assignee: PAYPAL, INC., San Jose, CA (US)

( * ) Notice: Subject to any disclaimer, the term of this patent is extended or adjusted under 35 U.S.C. 154(b) by 54 days.

(21) Appl. No.: 15/812,590

(22) Filed: Nov. 14, 2017

(65) Prior Publication Data
US 2018/0152408 A1    May 31, 2018

Related U.S. Application Data

(63) Continuation of application No. 13/932,707, filed on Jul. 1, 2013, now Pat. No. 9,819,627.

(51) Int. Cl.
G06F 15/16    (2006.01)
H04L 12/58    (2006.01)

(52) U.S. Cl.
CPC .................... *H04L 51/20* (2013.01)

(58) Field of Classification Search
CPC . H04L 51/20; H04L 12/1822; H04L 12/1818; H04L 51/32; H04L 67/24; G06F 3/0482
USPC ........................................................ 709/206
See application file for complete search history.

(56) References Cited

U.S. PATENT DOCUMENTS

| 9,819,627 B2 | 11/2017 | Cao |
| 2006/0270419 A1* | 11/2006 | Crowley ................. H04L 51/00 455/456.2 |
| 2008/0194272 A1 | 8/2008 | Smith et al. |
| 2010/0085462 A1 | 4/2010 | Sako et al. |
| 2011/0106896 A1 | 5/2011 | Baransky et al. |
| 2011/0271210 A1* | 11/2011 | Jones .................. H04L 12/1827 715/753 |

(Continued)

FOREIGN PATENT DOCUMENTS

WO    WO-2011137272 A2 *    11/2011    ........ H04M 3/42008

OTHER PUBLICATIONS

Matlock: A location obfuscation technique for accuracy-restricted applications Pedro M. Weightman;Miguel A. Jimeno;Daladier Jabba;Miguel Labrador 2012 IEEE Wireless Communications and Networking Conference (WCNC) (Year: 2012).*

*Primary Examiner* — Oscar A Louie
*Assistant Examiner* — Oluwatosin M Gidado
(74) *Attorney, Agent, or Firm* — Haynes and Boone, LLP

(57) ABSTRACT

Systems and methods for providing location-restricted message exchange include receiving, by a system provider device over a network from a sender device, a location-restricted message that includes sender message information and first location information that is associated with a first location. The system provider device then receives, over the network from a first receiver device, second location information that is associated with a second location. The system provider device then determines that the second location is in a limited geographic message exchange area with the first location and, in response, sends at least some of the sender message information by the system provider device over the network to the first receiver device. They system provider device may use filtering criteria provided by the first or second receiver device and use that filtering criteria to determine whether to send the sender message information to the first or second receiver device.

20 Claims, 11 Drawing Sheets

(56) References Cited

U.S. PATENT DOCUMENTS

| | | | |
|---|---|---|---|
| 2012/0023176 A1* | 1/2012 | Kevan | G06Q 50/20 |
| | | | 709/206 |
| 2012/0028600 A1 | 2/2012 | Vallaire | |
| 2013/0099941 A1* | 4/2013 | Jana | H04W 4/023 |
| | | | 340/905 |
| 2013/0315392 A1* | 11/2013 | Steinhauser | G06F 21/6209 |
| | | | 380/258 |
| 2014/0057550 A1* | 2/2014 | Alen | H04W 4/06 |
| | | | 455/3.06 |
| 2014/0334264 A1* | 11/2014 | Thaker | G01S 19/45 |
| | | | 367/118 |

* cited by examiner

LOCATION RESTRICTED MESSAGE EXCHANGE SYSTEM

CROSS-REFERENCE TO RELATED APPLICATIONS

This is a Continuation application to U.S. Utility application Ser. No. 13/932,707 filed Jul. 1, 2013, entitled "LOCATION RESTRICTED MESSAGE EXCHANGE SYSTEM," now U.S. Pat. No. 9,819,627, issued Nov. 14, 2017, the disclosure of which is incorporated herein by reference in its entirety.

BACKGROUND

Field of the Invention

The present invention generally relates to communications and more particularly to a location restricted message exchange system.

Related Art

More and more people are communicating over electronic networks such as, for example, the Internet. Communications over such electronic network are typically conducted using mobile devices, and may also take place with the aid of an on-line or mobile communications service provider. For example, mobile phone service providers may allow one-to-one or one-to-many communications through the use of email messaging or text messaging, where a sender provides a message and the contact information for any desired recipients. In another example, micro-blogging service providers provide one-to-many communications by allowing a sender to provide a message, and allowing any recipient to read that message by subscribing to the message feed of the sender, or searching for messages (e.g., using search terms) that appeal to them and that can return results that include messages from the sender. However, such conventional message exchange systems either require the recipient to be known, or only provide recipients the ability to receive messages based on a known sender or the content of the message.

Thus, there is a need for an improved message exchange system.

Figure 1:
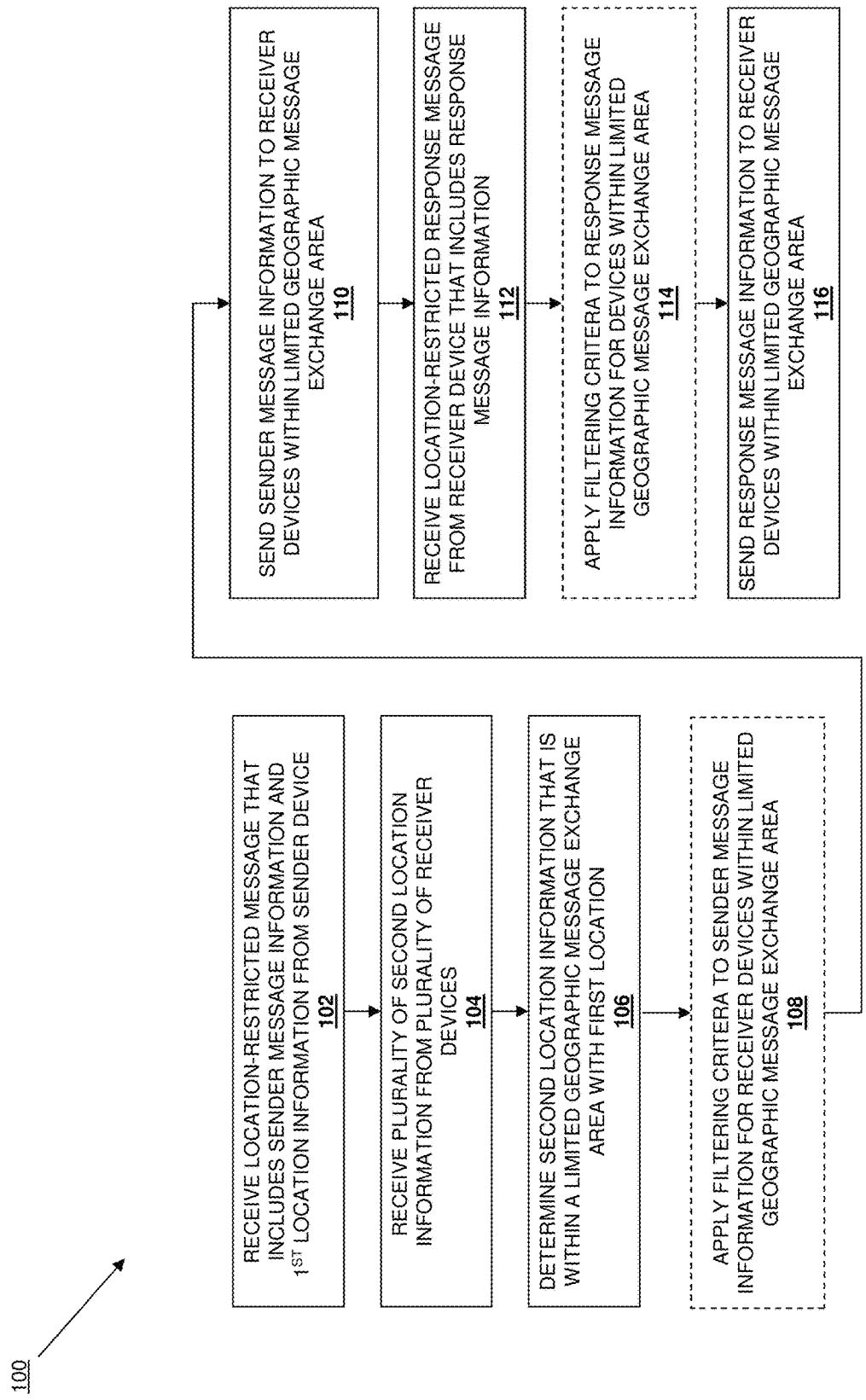
FIG. 1 is a flow chart illustrating an embodiment of a method for providing location restricted message exchange.

Embodiments of the present disclosure and their advantages are best understood by referring to the detailed description that follows. It should be appreciated that like reference numerals are used to identify like elements illustrated in one or more of the figures, wherein showings therein are for purposes of illustrating embodiments of the present disclosure and not for purposes of limiting the same.

DETAILED DESCRIPTION

The present disclosure provides systems and methods for providing location restricted message exchange between sender devices and receiver devices. Sender users may create messages and designate a location corresponding to a limited geographic message exchange area, and those message are sent to receiver devices located in that limited geographic message exchange area. For example, users of the location restricted message exchange system may include attendees of an event held at a venue. A sender user at the venue may use their sender device to create a message, and that message may then be distributed to receiver users that are located at the venue via their receiver devices. In another example, receiver users that are located at the venue may be targeted with messages by third party users that may or may not be located at the venue (e.g., third party users interested in the event but not attending the event, third party users selling products and/or services at the venue, venue operators, etc.) Receiver users may receive all messages sent to the venue, or may have filtering criteria applied to any message sent to the venue to tailor the content, senders, or other information associated with messages they receive. Receiver users may also send response messages in reply to any received message, and those response messages may then be distributed to the sender user and/or any receiver users that are located at the venue.

In some embodiments, the location restricted message exchange systems and methods described herein provide for geo-fenced message exchange between users in a common geographic area that may have similar interests, similar demographic characteristics, similar purchasing behavior, similar social networks, and/or any other characteristics desired. Such systems and methods leverage the common location of the users to allow those users to connect and/or interact based on their similarities in response to messages that are restricted to within that common location.

Referring now to FIG. 1, an embodiment of a method 100 for providing location restricted message exchange is illustrated. In some of the embodiments discussed below, the location restricted message exchange system is provided by an event ticket provider such as, for example, StubHub of San Francisco, Calif., in the course of providing event tickets to users. For example, an event ticket provider may sell venue tickets for events to users, and then provide the location restricted message exchange system during the event at the venue. However, in other embodiments, the location restricted message exchange system may be provided by event/venue operators, payment service providers (e.g., such as PayPal, Inc. of San Jose, Calif.), financial account providers, social network providers, micro-blogging providers, and/or any other third-party location restricted message exchange system provider provided using the teachings of the present disclosure. Furthermore, the present disclosure is not limited to providing location restricted message exchange at venues, and in embodiments may be provided at any desired location or area where users are located.

Figure 2:
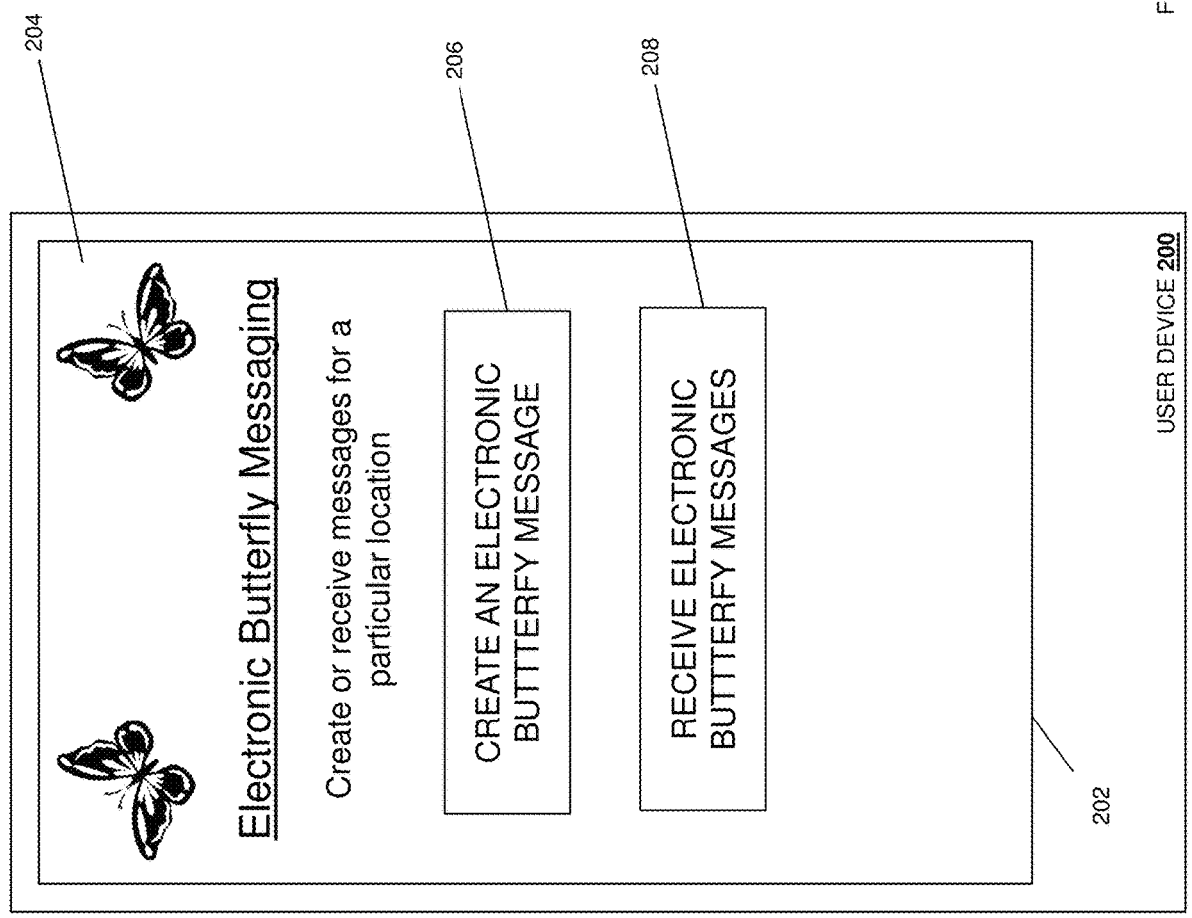
FIG. 2 is a front view illustrating an embodiment of a user device displaying a location restricted messaging start screen.

Referring now to FIGS. 1 and 2, the method 100 begins at block 102 where a location restricted message that includes sender message information and a first location is received from a sender device. FIG. 2 illustrates an embodiment of a user device 200 including a display 202 displaying a location restricted message start screen 204 that allows a user to create and send location restricted messages to, or subscribe to receive location restricted messages from, a location restricted message exchange system provider device ("system provider device" hereinafter) over a network. In an embodiment, the user device 200 includes a location restricted messaging exchange application that is used by the user device 200 to provide the location restricted message start screen 204, as well as any other functionality of the user devices discussed herein with regard to the location restricted message exchange system. In another embodiment, the user device 200 may access a web application (e.g., over the Internet) that is used by the user device 200 to provide the location restricted message start screen 204, as well as any other functionality of the user device 200 discussed herein with regard to the location restricted message exchange system.

As discussed above, the user device 200 may be operated by a user that is located at a venue or other location restricted message exchange location, as well as a user that is not located at the venue or other location restricted message exchange location. In the embodiment illustrated in FIG. 2, the location restricted message start screen 204 includes a create location restricted message button 206 that allows a user to become a sender user (and the user device 200 a sender user device) by creating a location restricted message and sending that location restricted message via their user device. In the embodiment illustrated in FIG. 2, the location restricted message start screen 204 also includes a receive location restricted message button 208 that allows a user to become a receiver user (and the user device 200 a receiver user device) by subscribing to one or more location restricted message exchange locations, sender users, message topics, etc., and receiving related location restricted messages via their user device. In the illustrations herein, the location restricted messages are referred to throughout as "electronic butterflies" in reference to the ability to release (i.e., send) messages out in a limited area to be viewed by other users in that limited area, and thus references to "butterflies" or "electronic butterflies" are directed to location restricted messages that may be "released" at a venue or other limited geographic area for users to view.

Figure 3:
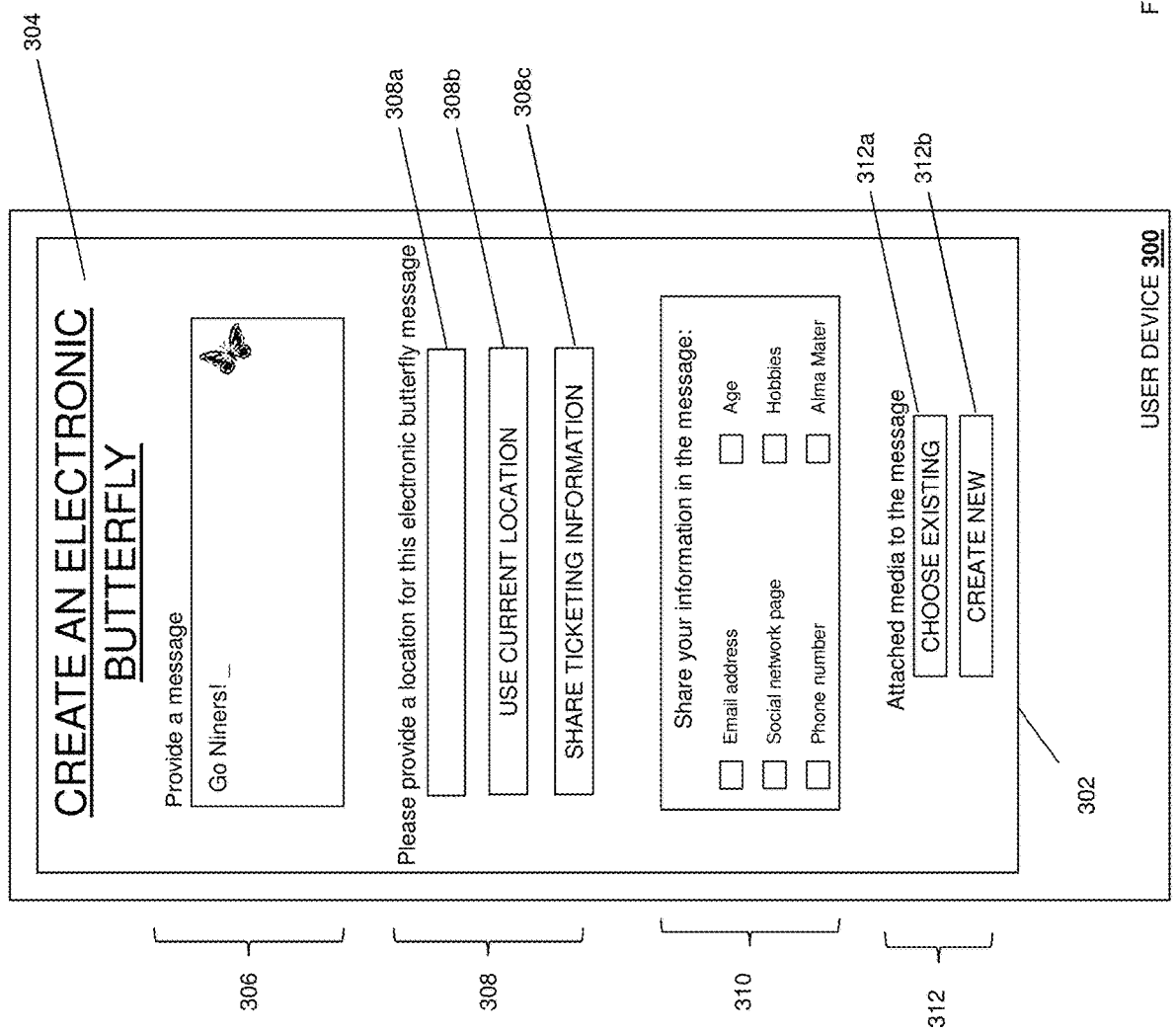
FIG. 3 is a front view illustrating an embodiment of a user device displaying a location restricted message creation screen.

Referring now to FIG. 3, an embodiment of a sender user device 300 is illustrated that includes a display 302 displaying a location restricted message creation screen 304. In an embodiment, the sender user device 300 may be the user device 200, discussed above with reference to FIG. 2, following a user of the user device 200 selecting the create location restricted message button 206. The location restricted message creation screen 304 includes a message input section 306 that allows a user of the sender user device 300 to provide message information including, for example, the message text in the illustrated embodiment (e.g., using an input device on the sender user device 300 such as a physical keyboard, a virtual keyboard, a voice recognition system, and/or a variety of other input devices known in the art.) The location restricted message creation screen 304 also includes a location provision section 308 that allows a user of the sender user device 300 to provide location information by, for example, providing a location in a location input 308a, selecting a use current location button 308b, and/or selecting a share ticking information button 308c (all described in further detail below.) The location restricted message creation screen 304 also includes a sender information section 310 that allows a user of the sender user device 300 to provide message information that includes information about themselves by, for example selecting sender information selectors for a user email address, a user social network page, a user phone number, a user age, a user hobbies, or a user alma mater. The location restricted message creation screen 304 also includes a media attachment section 312 that allows a user of the sender user device 300 to provide message information that includes a media attachment (e.g., images, video, audio, etc.) by, for example, selecting a choose existing button 312a to select media stored on the user device 300, or selecting a create new button 312b to create media using user device (e.g., using a camera, a microphone, etc.)

In one embodiment, a user of the sender user device 300 may be a user attending an event at a venue, and that user may create a message using the location restricted message creation screen 304. For example, that user may use a virtual keyboard (not illustrated) on the sender user device 300 to type message information for the message (e.g., "Go Niners!" in the illustrated embodiment). Furthermore, the user may provide location information by providing a location in the location input 308a (e.g., providing a venue name, a venue address, venue coordinates, a seating section in the venue, a seating row in the venue, a seat in the venue, etc.), selecting the use current location button 308b to instruct a location determination device (e.g., a global positioning system (GPS) device) in the sender user device 300 to determine location coordinates associated with the current location of the sender user device 300, and/or selecting the share ticking information button 308c to instruct the system provider device to retrieve information about tickets purchased for the event that the user is attending at the venue (e.g., seating information for the user including, for example, section information, row information, and/or seat information). Further still, the user may select any of the sender information selectors in the sender information section 310 to include that sender information as part of the message information in the message (e.g., from a user account with the location restricted message exchange system, from a database such as a social network provider database, etc.) Finally, the user may use either or both of the choose existing button 312a and the create new button 312b in the media attachment section 312 to use a camera on the sender user device 300 to attach an image as part of the message information for the message.

In other embodiments, a user of the sender user device 300 may be a user that is not attending an event at a venue, and that user may create a message using the location restricted message creation screen 304. For example, a user watching an event on television (e.g., at home and away from a venue) may create a message in substantially the same manner as discussed above for the user attending the event at the venue, with the exception that that user would provide location information in the location provision section 308 about the venue to which the message should be sent or associated with.

In another example, a user of the sender device 300 may be an event/venue operator or provider that wishes to message one or more users in the venue. That user may provide message information for the message (e.g., "$5 off hot dogs behind section 20!", promotional information, news or other information about the event occurring at the venue, etc.). Furthermore, the user may provide location information by providing a location in the location input 308a (e.g., a seating section 20 at the venue, through the entire venue, etc.) Finally, that user may use the choose existing button 312a in the media attachment section 312 to attach media (e.g., an image of a hot dog, a video of the event, etc.) as part of the message information for the message. Similarly, a user of the sender device 300 may be a product or service provider, and may create a message in substantially the same manner as discussed above for the event/venue operator/provider user in order to inform one or more users at the venue about their products and/or services. While a few examples have been provided, one of a skill in the art in possession of the teachings of the present disclosure will recognize that a wide variety of users may create and target a message for other users in a particular location without departing from the scope of the present disclosure.

Figure 4:
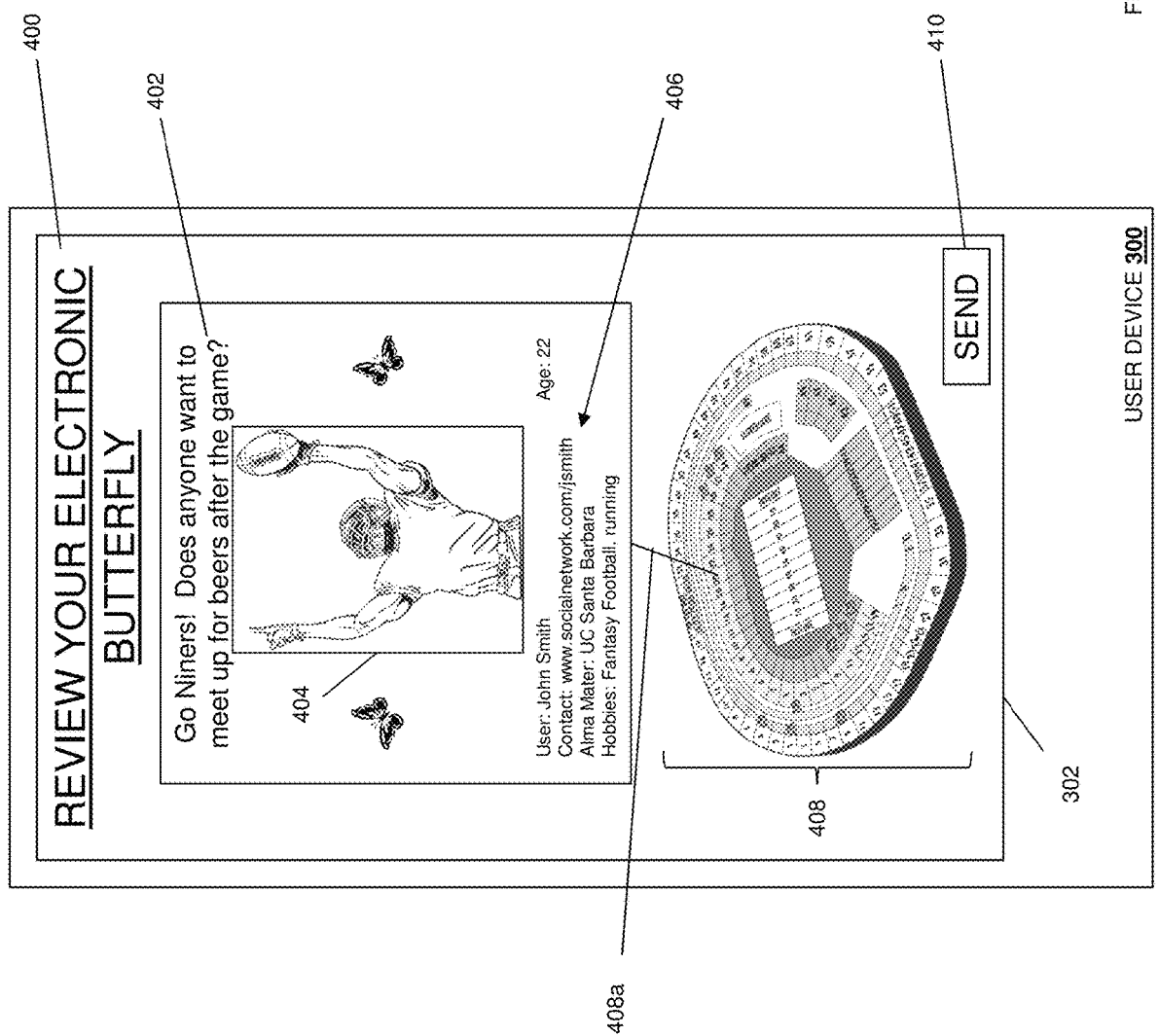
FIG. 4 is a front view illustrating an embodiment of a user device displaying a location restricted message review screen.

FIG. 4 illustrates the sender user device 300 displaying a location restricted message review screen 400. In the illustrated embodiment, the location restricted message review screen 400 is displayed by the sender user device 300 in response to the user discussed above that is attending the event at the venue creating a location restricted message through the location restricted message creation screen 304. However, similar location restricted message review screens may be provided for any user creating a message using the location restricted message creation screen 304. The location restricted message review screen 400 includes message text 402 (e.g., "Go Niners! Does anyone want to meet up for beers after the game?" in the illustrated embodiment), which may have been provided through the message input section 306 on the location restricted message creation screen 304. The location restricted message review screen 400 also include a media attachment 404 (e.g., the image of the football player in the illustrated embodiment), which may have been provided using the media attachment section 312 on the location restricted message creation screen 304. The location restricted message review screen 400 also includes sender information 406 (e.g., the sender users name, social media page address, alma mater, hobbies, and age in the illustrated embodiment), which may have been provided using the sender information section 310 on the location restricted message creation screen 304. The location restricted message review screen 400 also includes a location graphical display 408 (e.g., the graphic of a stadium venue in the illustrate embodiment), which may have been provided using the share ticking information button 308c in the location provision section 308 of the location restricted message creation screen 304.

For example, in response to the user of the sender user device 300 selecting the share ticking information button 308c in the location provision section 308 of the location restricted message creation screen 304, and instruction may be sent to the system provider device to retrieve information about tickets purchased for the event at the venue that the user is attending. In response, the system provider device (which, in some embodiments, may have been involved in the sale of those tickets to the user, and thus has quick access to such information) retrieves the information about the tickets purchased and sends that information back to the sender user device 300. In other embodiments, the information about the tickets purchased for the event at the venue that the user is attending may be stored on the sender user device 300 (e.g., in a payment application, in a calendar application, etc.) and retrieved from its storage location. Either way, the information about tickets purchased for the event at the venue that the user is attending may be used, along with a retrieved (e.g., over the Internet) graphic detailing the layout of the venue, to provide the location graphical display 408 including a graphical rendering of the venue along with a pointer 408a to the location of the user of the sender user device 300 (e.g., pointing to a section, a row, and/or a seat or seats purchased by that user.) The location restricted message review screen 400 includes a send button 410 that the user may select to send sender message information (i.e., the message information displayed on the location restricted message review screen 400 as well as any metadata or other information associated with the message created by the user of the sender user device 300) over a network to the system provider device. For example, in response to selecting the send button 410, a POST web service call to a system provider device application programming interface (API) may be sent over the network to the system provider device along with any location formation.

Figure 5:
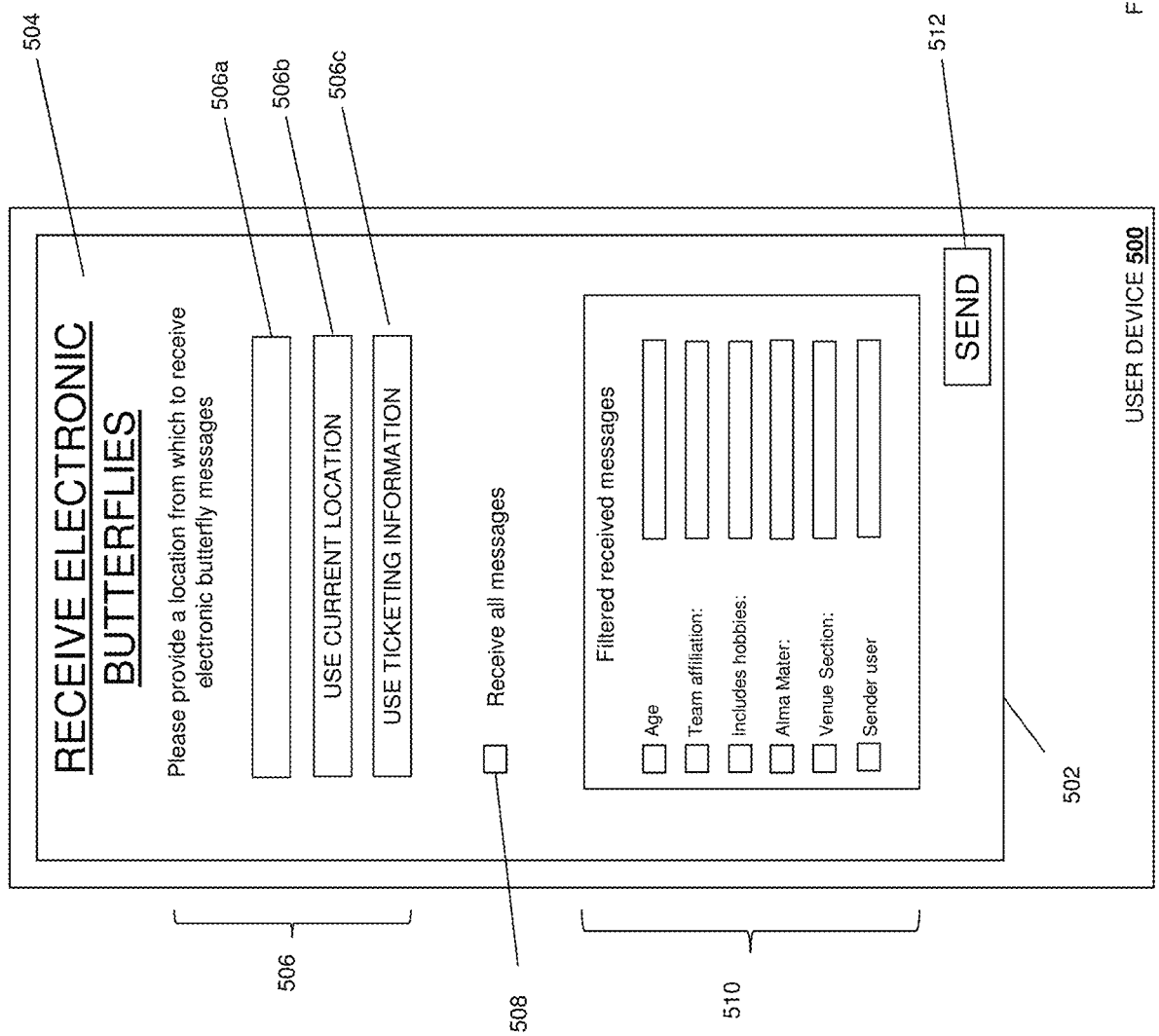
FIG. 5 is a front view illustrating an embodiment of a user device displaying a location restricted message exchange subscription screen.

Referring now to FIGS. 1 and 5, the method 100 then proceeds to block 104 where a plurality of second location information is received from a plurality of receiver devices. As discussed above, a plurality of receiver users of the location restricted message exchange system may include receiver user devices. For example, a plurality of receiver users attending an event at a venue may each include a mobile receiver user device (e.g., a mobile phone, tablet, or other computing device) that may communicate with the system provider device to provide its location (e.g., using a location determination device in the user device.) In some embodiments, the receiver user devices may automatically determine and provide their current locations periodically or in response to a request (e.g., from the system provider device) such that the system provider device receives those current locations. In other embodiments, the receiver users may input instructions on their receiver user devices to send their current locations to the system provider device (e.g., when informed about, and in order to participate in, the location restricted message exchange system.)

FIG. 5 illustrates an embodiment of a receiver user device 500 that includes a display 502 displaying a location restricted message exchange subscription screen 504. In an embodiment, the receiver user device 500 may be the user device 200, discussed above with reference to FIG. 2, following a user of the user device 200 selecting the receive location restricted message button 208 on the location restricted message start screen 204. The location restricted message exchange subscription screen 504 includes a location provision section 506 that allows the receiver user to provide their current location through a location input 506a, a use current location button 506b, or a use ticketing button 506c; a receive all messages selector 508 that allows the user to request to receive any or all message sent through the location restricted message exchange system to a venue or their current location, and a message filtering section 310 that allows the receiver user to provide filtering criteria to filter messages that are received from the system provider device for a venue or their current location. The location restricted message subscription screen 504 also includes a send button 512 that the receiver user may select to send the location provided in the location provision section 506 and any filtering criteria provided in the message filtering section 310. For example, selection of the send button 512 by the receiver user may result in a GET web service call to a system provider device API, along with the location information, being sent over the network to the system provider device.

In one example, the receiver user of the receiver user device 500 may enter a venue and be informed that a location restricted message exchange system is being provided and, in response, start an application (e.g., native to the receiver user device 500, accessed over the Internet, etc.) that provides the location restricted message start screen 204 and, upon selection of the receive location restricted message button 208, the location restricted message exchange subscription screen 504. The receiver user may then provide their current location by entering it in the location input 506*a* (e.g., providing a venue name, a venue address, venue coordinates, a seating section in the venue, a seating row in the venue, a seat in the venue, etc.), selecting the user current location button 506*b* to have a location determination device in the receiver user device 500 determine a current location, or selecting the use ticking information button 506*c* that instructs the system provider device to retrieve ticketing information for the receiver user to determine their current location. Furthermore, the receiver user may select the receive all messages selector 508 to create an instruction to the system provider device to send the receiver user device 500 any messages sent through the location restricted message exchange system to the venue, or provide filtering criteria in the message filtering section 510 (e.g., an age, a team affiliation, hobbies, an alma mater, a venue section, and or a sender user identifier in the illustrated embodiment) to create an instruction to the system provider device to send the receiver user device 500 messages sent through the location restricted message exchange system to the venue that qualify per that filtering criteria. While a few examples of filtering criteria have been provided in the illustrated embodiment, any message filtering criteria known in the art is envisioned as falling within the scope of the present disclosure.

While the embodiment discussed above and illustrated in FIG. 5 includes a user opting into the location restricted message exchange system by sending a current location and details about messages to be received, in some embodiments, receiver users devices may send their location without instruction by their receiver user. For example, the receiver user may set up their receiver user device (or location restricted message exchange application) to communicate its current location to the system provider device without the need for instruction by the receiver user (e.g., periodically, in response to a request from the system provider device, etc.) Thus, at block 104, the system provider device may receive the current locations of receiver user devices without instruction from their receiver users. However, in some embodiments, receiver users may be given the ability to "opt in" to the location restricted message exchange system and/or instruct the system provider device about which messages they would like to receive (e.g., via a screen substantially similar to the location restricted message subscription screen 504.) In some embodiments, the receiver users may be sent the first message sent by any sender user to the venue, and then given an opportunity to receive further message from that sender user, or "block" that sender user so they do not receive further messages from them.

The method 100 then proceeds to block 106 where the second location information received from the receiver devices at block 104 is determined to be within a limited geographic message exchange area with the first location received from the sender device at block 102. In an embodiment, the location restricted message exchange system includes a database of limited geographic message exchange areas that may correspond with venues, stadiums, merchant locations, cities, neighborhoods, shopping districts, landmarks, and/or any other definable geographic location known in the art. The limited geographic message exchange areas may defined by names (e.g., venue names, merchant names, city names, neighborhood names, shopping district names, landmark names, etc.), addresses (e.g., venue addresses, merchant addresses, etc.), coordinates (e.g., GPS coordinates), and/or any other geographic location descriptor known in the art. Each limited geographic message exchange area may include a defined perimeter. For example, the defined perimeter may be defined as a predetermined distance from a point associated with the limited geographic message exchange area (e.g., GPS coordinates may define a limited geographic message exchange area, and the defined perimeter of the limited geographic message exchange area may be defined by any location within 1000 feet of those GPS coordinates.) However, in other embodiments, the defined perimeter of a limited geographic message exchange area may include streets (e.g., bounding a city, neighborhood, shopping district, etc.), landmarks (e.g., rivers, borders, etc.), and/or any other geographic or locational feature that may be used to bound an area within which messages may be exchanged according to the teachings of the location restricted message exchange system in the present disclosure.

In an embodiment of block 106, the system provider device uses the first location received from the sender user device at block 102 to determine whether that first location is within a limited geographic message exchange area included in the database. For example, the system provider device may determine that the first location received from the sender user device at block 102 is included in a limited geographic message exchange area for a venue by determining that a location name provided by the user sender device is a location name of the venue, determining that a location address provided by the user sender device is a location address of the venue, determining that location coordinates provided by the user sender device are within a predetermined distance of location coordinates associated with the venue, determining that ticketing information associated with the user sender device is also associated with the venue, and/or using a variety of other associations between the first location and a limited geographic exchange area that would be apparent to one of skill in the art in possession of the present disclosure.

In some embodiments, the system provider device may create a limited geographic message exchange area in response to the first location received from the sender user device at block 102 not being within a limited geographic message exchange area included in the database. For example, the system provider device may receive a sender message from a sender user device located at a park, and in response to determining that park is not associated with a limited geographic message exchange area included in the database, the system provider device may create a limited geographic message exchange area for that park (e.g., using a name of the park, an address of the park, coordinates for the park, along with known boundaries for the park (or a predetermined distance) that provide a defined perimeter of the park, etc.) Thus, the system provider device may create limited geographic exchange areas "on the fly" when sender messages are sent to the location restricted message exchange system. As such, using the park example above, a user located at the park or not located at the park may create a location restricted message for receiver devices located at the park and send it to the system provider device, and the system provider device may then create a limited geographic message exchange area for that park so that that location restricted message may be distributed to the receiver devices in the park.

Once a limited geographic message exchange area has been determined (or created) that includes the first location, the system provider device reviews the second locations received from receiver user devices to determine which of those receiver user devices is associated with a second location that is within that limited geographic message exchange area. As discussed above, the system provider device may receive second locations from a plurality of receiver user devices at a plurality of different locations. For example, the system provider device may provide the location restricted message exchange system for a variety of different limited geographic message exchange areas and/or a variety of different user devices and, as such, the system provider device may receive, store, and track the current location of receiver devices that are located in a plurality of different locations. Thus, at block 106 of the method, the system provider device may use the limited geographic message exchange area associated with the first location to determine which of a plurality of receiver user devices are associated with a second location in a user device location database that is within that limited geographic message exchange area.

Therefore, for any sender message received from a sender user device in the location restricted message exchange system, a limited geographic message exchange area may be determined for that message, and one or more receiver user devices in that limited geographic message exchange area may be determined. One of skill in the art will recognize that this may be performed for any number of limited geographic message exchange areas to provide location restricted message exchanges in a plurality of different locations.

The method 100 may then proceeds to optional block 108, where filtering criteria may be applied to the sender message received by block 102 for any receiver user device that was determined to be located within the limited geographic message exchange area at block 106. In some embodiments, receiver user devices in a location restricted message exchange area may receive any sender message that is sent to that location restricted message exchange area (e.g., either by opting to receive all messages, by default, etc.), and optional block 108 may not be performed. However, as discussed above with reference to FIG. 5, a receiver user may provide filtering criteria to filter any message that is received through the location restricted message exchange system for determining whether to send those messages to the receiver user device 500. As such, for each sender message and receiver user devices associated with a limited geographic message exchange area, the system provider device may retrieve the filtering criteria provided by the receiver user devices to determine whether to send the sender message to those receiver user devices. Furthermore, because each user may provide different filtering criteria for received messages from the location restricted message exchange system, each sender user and/or each message may be associated with a different group of receiver users. Further still, filtering criteria (e.g., similar to that illustrated in FIG. 5 for the receiver user) may be provided to the sender user during the creation of a message (e.g., on the location restricted message creation screen 304 illustrated in FIG. 3) to filter which receiver user devices (and receiver users) the sender message may be sent to in substantially the same manner as described below with regard to filtering messages received by receiver users (e.g., using filtering criteria associated with the receiver users in receiver user accounts associated with the location restricted message exchange system.)

Using the example of the message created by the sender user in FIG. 4, the sender message includes a variety of message information including message text, an image, sender information, and location information. Furthermore, implicit information may be determined from that message information. For example, a team affiliation and/or hobbies (if not provided as part of the sender information) could be determined from the message text (e.g., "Go Niners" as an indication of a team affiliation for the San Francisco 49ers American football team, "meet up for beers" as an indication of a hobby of drinking, etc.). At block 108, the system provider device may apply the filtering criteria provided by the receiver user devices in the limited geographic message exchange area to that message information to determine which receiver user devices to send the sender message to. In a specific example, a receiver user may provide filtering criteria such that their receiver user device will only receive messages from San Francisco 49er fans that are between 21-25 years of age and that include an image. However, one of skill in the art in possession of the present disclosure would recognize that a receiver user may use any filtering criteria to ensure that only sender messages having particular characteristics are received by their receiver user devices.

Figure 6:
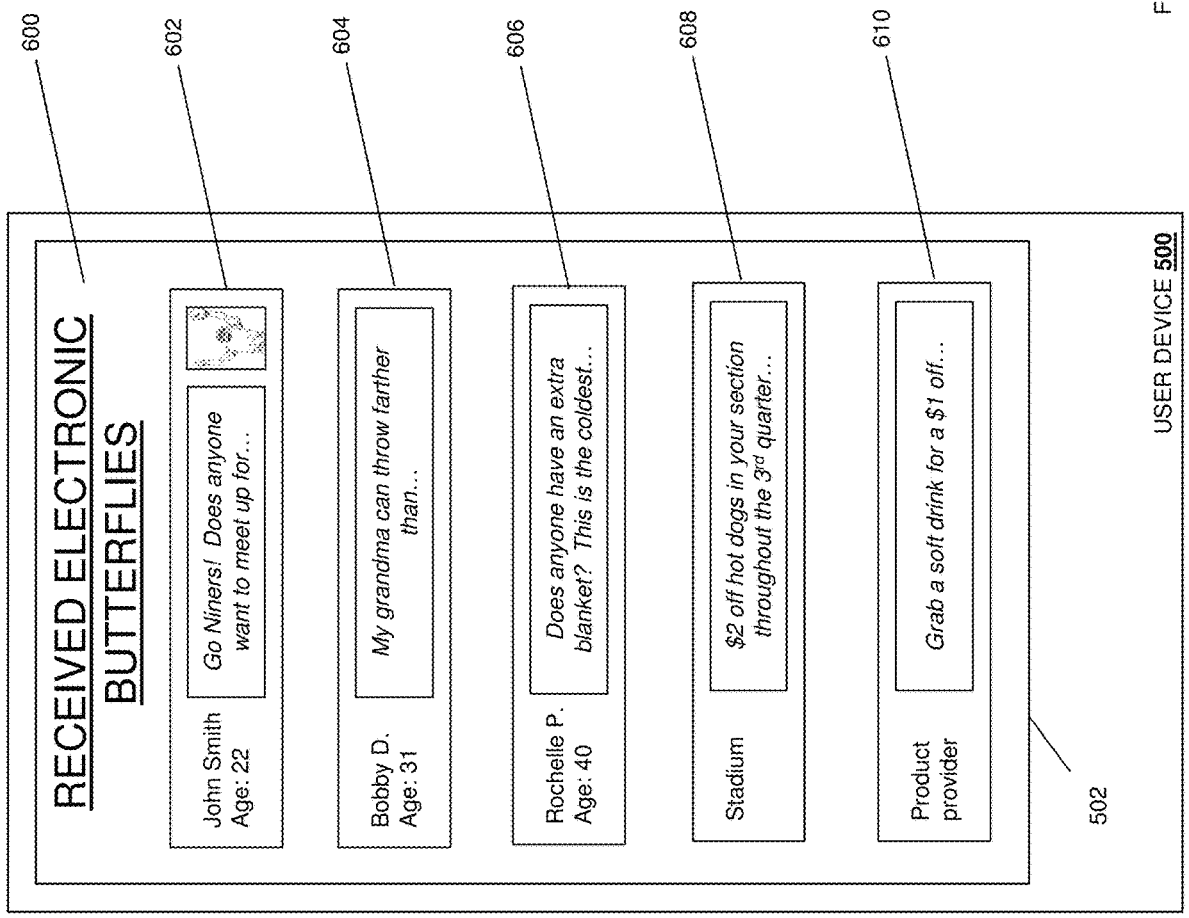
FIG. 6 is a front view illustrating an embodiment of a user device displaying a received location restricted messages screen.

Referring now to FIGS. 1, and 6, the method 100 the proceeds to block 110 where sender message information is sent to receiver devices within the limited geographic message exchange area. In an embodiment of block 110, the system provider device sends some or all of the sender message information received at block 102 over the network to the receiver user devices that were determined to be within the limited geographic message exchange area at block 106 (and in some cases that were determined to have provided filtering criteria at block 108 that allows receipt of the sender message information). FIG. 6 illustrates an embodiment of the receiver user device 500 displaying a received location restricted messages screen 600 that displays messages received by the receiver user device 500 through the location restricted message exchange system. The received location restricted messages screen 600 includes a plurality of received messages 602, 604, 606, 608, and 610. In the illustrated embodiment, the received messages include received messages 602, 604, and 606 from users located at (or not located at) the venue, a received message 608 from an event/venue operator, and a received message 610 from a product provider that provides products at the event/venue. Each of the messages 602, 604, 606, 608, and 610 include summaries of some of the message information (e.g., name, age, partial message text, and attached media in the illustrated embodiment), and the receiver user may then select any of the messages 602, 604, 606, 608, and 610 to view the complete message (e.g., the message as illustrated in FIG. 4.)

In some embodiments, the system provider device may not have received filtering criteria from receiver user devices, but may operate to limit the receiver user devices to which it sends the sender message. In one example, the system provider device may retrieve user account information associated with user accounts for the location restricted message exchange system that are stored in a database, and use that user account information to determine which receiver user devices to send the sender message to. For example, receiver user devices to send the sender message may be selected by the system provider device based on user account information associated with their respective receiver users including common user interests with the sender user (e.g., from a sender user account or the sender message), similar age demographics, a history of similar event purchases or other purchases (e.g., from a purchase history of the receiver users and the sender user), social network characteristics (e.g., the receiver users and the sender users have similar friends), similar social groups (e.g., the receiver users and the sender user belonging to similar social network groups), and/or a variety of other sender user and receiver user characteristics known in the art.

The method 100 may then proceed to block 112, where a location restricted response message may be received from a receiver device that includes response message information. In an embodiment, any receiver user device that receives a sender message may respond to that sender message with a response message, and that response message may be created substantially as discussed above with reference to FIGS. 3 and 4. As such, a response message is substantially similar to the sender message discussed above, with the exception that it may include some of the sender message information that is being responded to. Thus at block 112, the system provider device may receive one or more response messages from one or more receiver user devices that received the sender message information at block 110.

The method 100 may then proceed to optional block 112, where filtering criteria from receiver devices within the limited geographic area may be applied to the response message. In an embodiment, the system provider device may apply filtering criteria from receiver devices to the response message in substantially the same manner as described above with reference to block 108. The method 100 may then proceed to block 116 where the response message is sent to receiver devices within the limited geographic message exchange area. In an embodiment, the system provider device may send the response message information to receiver devices within the limited geographic message exchange area in substantially the same manner as described above for block 110. Because different receiver users may provide different filtering criteria to the location restricted message exchange system, a response message may be provided to a group of the same receiver devices that received the sender message (to which the response message is responding to), or to a group of receiver devices that is different (e.g., due to the application of filtering criteria applied to the new sender of the response message rather than the original sender of the sender message.)

Thus, systems and methods for providing location restricted message exchange have been described that allow messages to be provided and/or exchanged in a particular geographic area or location. Users may direct messages to those particular geographic areas or locations, and other users at those particular geographic areas or locations may receive those message. Messages received at those particular geographic areas or locations may be filtered by users to tailor the message content, senders, and/or other attributes of messages received by those users, and one of skill in the art will recognize that location restricted message exchange as described herein provides benefits over conventional systems that limit a sender user to sending messages to receiver users that are known, or limit a receiver user from receiving message based on the identity of the sender user and/or the content of the message.

Figure 7:
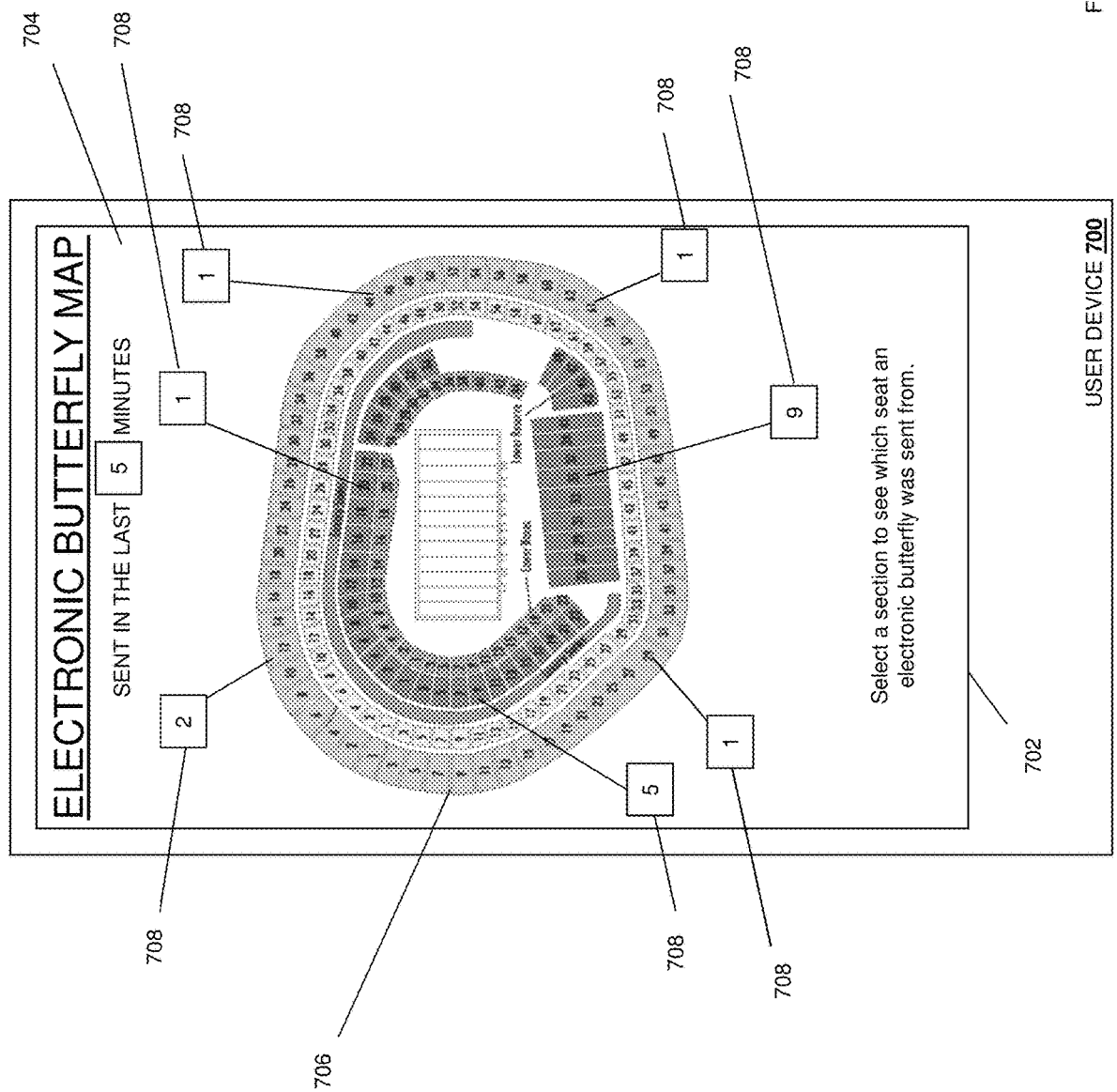
FIG. 7 is a front view illustrating an embodiment of a user device displaying a location restricted messages graphical display screen.

In addition to the exchange of messages, the location restricted message exchange system provides a number of other benefits with regard to the collection of information from and the provision of information to users of the location restricted message exchange system. For example, FIG. 7 illustrates a user device 700, which may be the user device 200, the sender user device 300, or the receiver user device 500 discussed above, including a display 702 displaying a location restricted messages graphical display screen 704 that displays where location restricted messages are being sent from within a venue. The location restricted messages graphical display screen 704 includes a venue graphic 706 and a plurality of location restricted message location indicators 708. In the illustrated embodiment, the venue graphic 706 includes details about the venue including different seating sections in the venue, and the location restricted message location indicators 708 indicate which seating sections the location restricted messages are being sent from. As indicated on the location restricted messages graphical display screen 704, a user of the user device 700 may select a location restricted message location indicator 708 to be provided a graphic of a seat in a seating row that is in the seating section from which a location restricted message is being sent. Furthermore, as also indicated on the location restricted messages graphical display screen 704, the user of the user device 700 may provide a desire time period in which location restricted messages sent in the venue should be displayed using the location restricted message location indicators 708.

The location restricted messages graphical display screen 704 is but one embodiment of information and an informational screen that that may be collected and provided in the location restricted message exchange system. In other examples, information provided by the user in the location restricted message exchange system (e.g., as sender information in a sender message, as part of a user profile of the user that is stored in the location restricted message exchange system, etc.) may be used to provide, for example, where in the venue users of a particular ages/age groups are sitting, where in the venue users of a particular team affiliation are sitting, the hobbies of users in the venue, and/or any information discernible from the users to the location restricted message exchange system. With regard to messages sent from users not located at the event/venue, event/venue operators, products providers, etc., location restricted message location indicators 708 may be used to indicate the location of a point of interest in the message (e.g., a location of a venue or product deal, a location of news information, a location of something going on at the venue that the user is referencing in the message, etc.)

Figure 8:
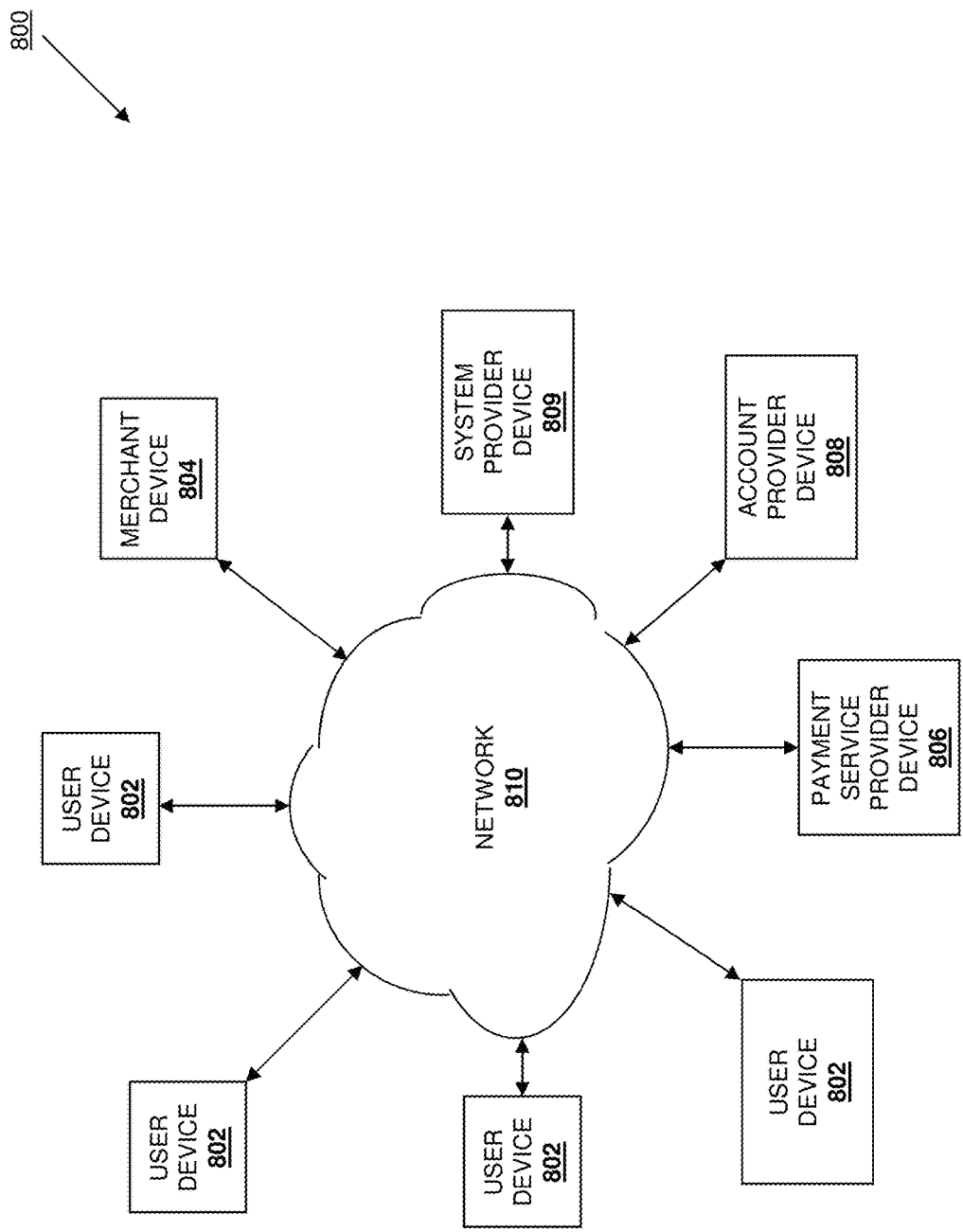
FIG. 8 is a schematic view illustrating an embodiment of a networked system.

Referring now to FIG. 8, an embodiment of a network-based system 800 for implementing one or more processes described herein is illustrated. As shown, network-based system 800 may comprise or implement a plurality of servers and/or software components that operate to perform various methodologies in accordance with the described embodiments. Exemplary servers may include, for example, stand-alone and enterprise-class servers operating a server OS such as a MICROSOFT® OS, a UNIX® OS, a LINUX® OS, or other suitable server-based OS. It can be appreciated that the servers illustrated in FIG. 8 may be deployed in other ways and that the operations performed and/or the services provided by such servers may be combined or separated for a given implementation and may be performed by a greater number or fewer number of servers. One or more servers may be operated and/or maintained by the same or different entities.

The embodiment of the networked system 800 illustrated in FIG. 8 includes a plurality of user devices 802, a merchant device 804, a payment service provider device 806, a plurality of account holder devices 808, and/or a system provider device 809 in communication over a network 810. Any of the user devices 802 may be the user devices 200, 300, 500, or 700, discussed above. The merchant device 804 may be the merchant devices discussed above and may be operated by the merchants discussed above. The payment service provider device 806 may be the payment service provider devices discussed above and may be operated by a payment service provider such as, for example, PayPal Inc. of San Jose, Calif. The account provider devices 808 may be the account provider devices discussed above and may be operated by the account providers discussed above such as, for example, credit card account providers, bank account providers, savings account providers, and a variety of other account providers known in the art. The system provider device 809 may be the system providers devices discussed above and may be operated by the system providers discussed above.

The user devices 802, merchant device 804, payment service provider device 806, account provider devices 808, and system provider device 809 may each include one or more processors, memories, and other appropriate components for executing instructions such as program code and/or data stored on one or more computer readable mediums to implement the various applications, data, and steps described herein. For example, such instructions may be stored in one or more computer readable mediums such as memories or data storage devices internal and/or external to various components of the system 800, and/or accessible over the network 810.

The network 810 may be implemented as a single network or a combination of multiple networks. For example, in various embodiments, the network 810 may include the Internet and/or one or more intranets, landline networks, wireless networks, and/or other appropriate types of networks.

The user devices 802 may be implemented using any appropriate combination of hardware and/or software configured for wired and/or wireless communication over network 810. For example, in one embodiment, the user devices 802 may be implemented as a personal computer of a user in communication with the Internet. In other embodiments, the user devices 802 may be a smart phone, personal digital assistant (PDA), laptop computer, and/or other types of computing devices.

The user devices 802 may include one or more browser applications which may be used, for example, to provide a convenient interface to permit the user to browse information available over the network 810. For example, in one embodiment, the browser application may be implemented as a web browser configured to view information available over the Internet.

User devices 802 may also include one or more toolbar applications which may be used, for example, to provide user-side processing for performing desired tasks in response to operations selected by the user. In one embodiment, the toolbar application may display a user interface in connection with the browser application.

The user devices 802 may further include other applications as may be desired in particular embodiments to provide desired features to the user devices 802. In particular, the other applications may include a payment application for payments assisted by a payment service provider through the payment service provider device 806. The other applications may also include security applications for implementing user-side security features, programmatic user applications for interfacing with appropriate application programming interfaces (APIs) over the network 810, or other types of applications. Email and/or text applications may also be included, which allow the user to send and receive emails and/or text messages through the network 810. The user devices 802 include one or more user and/or device identifiers which may be implemented, for example, as operating system registry entries, cookies associated with the browser application, identifiers associated with hardware of the user devices 802, or other appropriate identifiers, such as a phone number. In one embodiment, the user identifier may be used by the payment service provider device 806, account provider device 808, and/or system provider device 809 to associate the user with a particular account as further described herein.

The merchant device 804 may be maintained, for example, by a conventional or on-line merchant, conventional or digital goods seller, individual seller, and/or application developer offering various products and/or services in exchange for payment to be received conventionally or over the network 810. In this regard, the merchant device 804 may include a database identifying available products and/or services (e.g., collectively referred to as items) which may be made available for viewing and purchase by the user.

The merchant device 804 also includes a checkout application which may be configured to facilitate the purchase by the payer of items. The checkout application may be configured to accept payment information from the user through the user devices 802, the account provider through the account provider device 808, from the payment service provider through the payment service provider device 806, and/or from the system provider through the system provider device 809 over the network 810.

Figure 9:
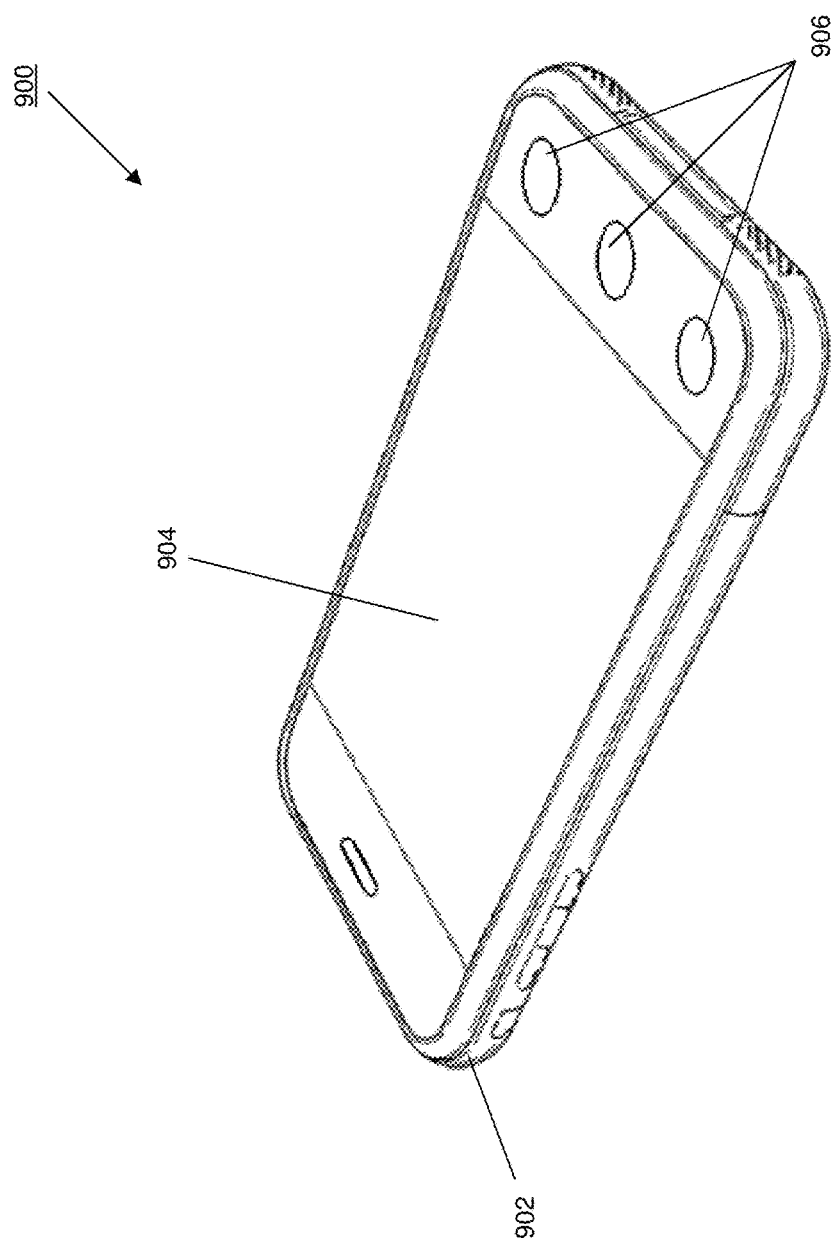
FIG. 9 is a perspective view illustrating an embodiment of a user device.

Referring now to FIG. 9, an embodiment of a user device 900 is illustrated. The user device 900 may be the user devices 200, 300, 500, 700, and/or 802. The user device 900 includes a chassis 902 having a display 904 and an input device including the display 904 and a plurality of input buttons 906. One of skill in the art will recognize that the user device 900 is a portable or mobile phone including a touch screen input device and a plurality of input buttons that allow the functionality discussed above with reference to the method 100. However, a variety of other portable/mobile user devices and/or desktop user devices may be used in the method 100 without departing from the scope of the present disclosure.

Figure 10:
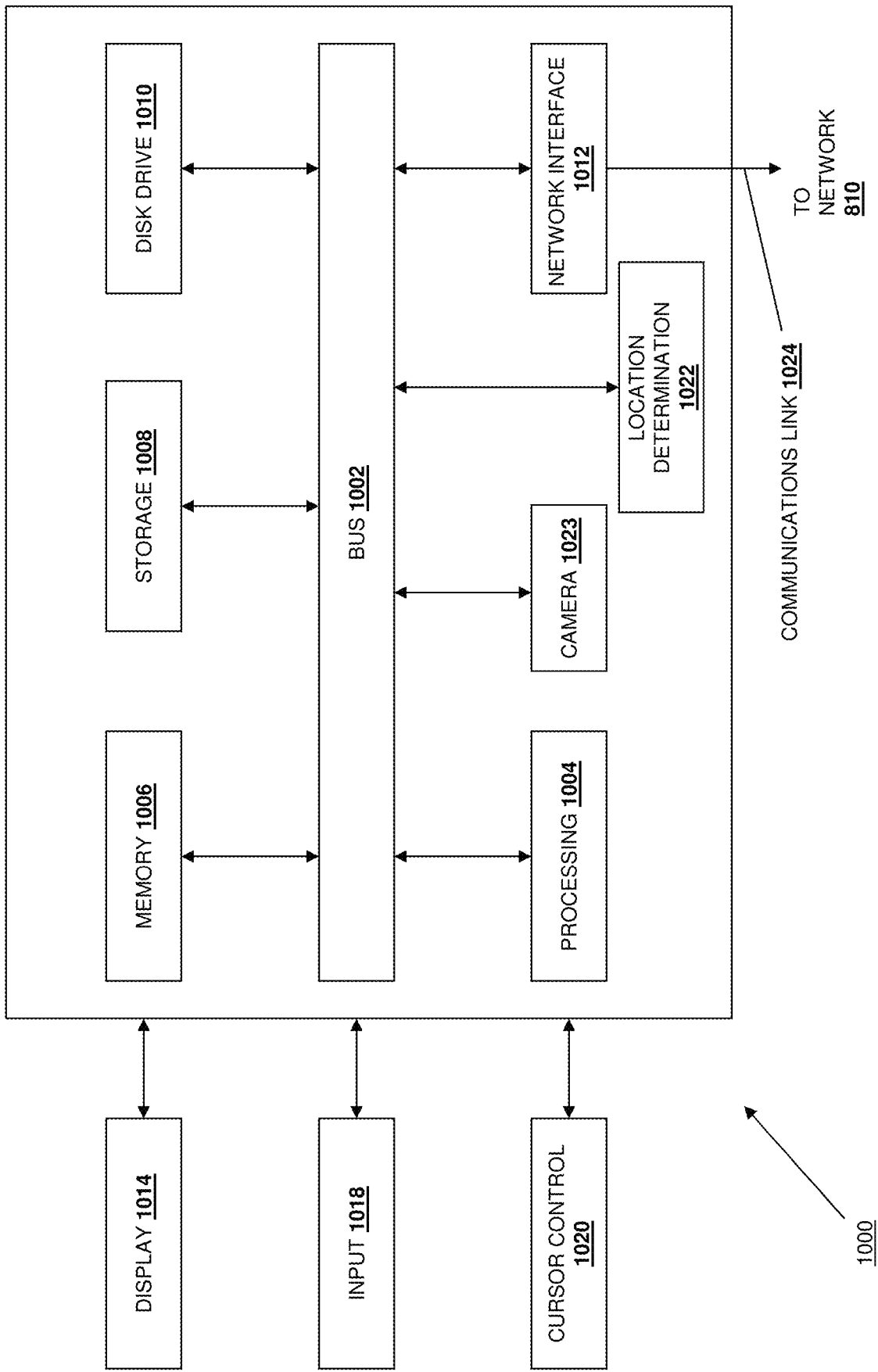
FIG. 10 is a schematic view illustrating an embodiment of a computer system.

Referring now to FIG. 10, an embodiment of a computer system 1000 suitable for implementing, for example, the user devices 200, 300, 500, 700, 802, and/or 900, the merchant device 804, the payment service provider device 806, the account provider device 808, and/or the system provider device 809 is illustrated. It should be appreciated that other devices utilized by users, merchants, payment service providers, account providers, and system providers in the location restricted message exchange system discussed above may be implemented as the computer system 1000 in a manner as follows.

In accordance with various embodiments of the present disclosure, computer system 1000, such as a computer and/or a network server, includes a bus 1002 or other communication mechanism for communicating information, which interconnects subsystems and components, such as a processing component 1004 (e.g., processor, micro-controller, digital signal processor (DSP), etc.), a system memory component 1006 (e.g., RAM), a static storage component 1008 (e.g., ROM), a disk drive component 1010 (e.g., magnetic or optical), a network interface component 1012 (e.g., modem or Ethernet card), a display component 1014 (e.g., CRT or LCD), an input component 1018 (e.g., keyboard, keypad, or virtual keyboard), a cursor control component 1020 (e.g., mouse, pointer, or trackball), a location determination component 1022 (e.g., a Global Positioning System (GPS) device as illustrated, a cell tower triangulation device, and/or a variety of other location determination devices known in the art), and/or a camera component 1023. In one implementation, the disk drive component 1010 may comprise a database having one or more disk drive components.

In accordance with embodiments of the present disclosure, the computer system 1000 performs specific operations by the processor 1004 executing one or more sequences of instructions contained in the memory component 1006, such as described herein with respect to the user devices 200, 300, 500, 700, 802, and/or 900, the merchant device 804, the payment service provider device 806, the account provider device 808, and/or the system provider device 809. Such instructions may be read into the system memory component 1006 from another computer readable medium, such as the static storage component 1008 or the disk drive component 1010. In other embodiments, hard-wired circuitry may be used in place of or in combination with software instructions to implement the present disclosure.

Logic may be encoded in a computer readable medium, which may refer to any medium that participates in providing instructions to the processor 1004 for execution. Such a medium may take many forms, including but not limited to, non-volatile media, volatile media, and transmission media. In one embodiment, the computer readable medium is non-transitory. In various implementations, non-volatile media includes optical or magnetic disks, such as the disk drive component 1010, volatile media includes dynamic memory, such as the system memory component 1006, and transmission media includes coaxial cables, copper wire, and fiber optics, including wires that comprise the bus 1002. In one example, transmission media may take the form of acoustic or light waves, such as those generated during radio wave and infrared data communications.

Some common forms of computer readable media includes, for example, floppy disk, flexible disk, hard disk, magnetic tape, any other magnetic medium, CD-ROM, any other optical medium, punch cards, paper tape, any other physical medium with patterns of holes, RAM, PROM, EPROM, FLASH-EPROM, any other memory chip or cartridge, carrier wave, or any other medium from which a computer is adapted to read. In one embodiment, the computer readable media is non-transitory.

In various embodiments of the present disclosure, execution of instruction sequences to practice the present disclosure may be performed by the computer system 1000. In various other embodiments of the present disclosure, a plurality of the computer systems 1000 coupled by a communication link 1024 to the network 810 (e.g., such as a LAN, WLAN, PTSN, and/or various other wired or wireless networks, including telecommunications, mobile, and cellular phone networks) may perform instruction sequences to practice the present disclosure in coordination with one another.

The computer system 1000 may transmit and receive messages, data, information and instructions, including one or more programs (i.e., application code) through the communication link 1024 and the network interface component 1012. The network interface component 1012 may include an antenna, either separate or integrated, to enable transmission and reception via the communication link 1024. Received program code may be executed by processor 1004 as received and/or stored in disk drive component 1010 or some other non-volatile storage component for execution.

Figure 11:
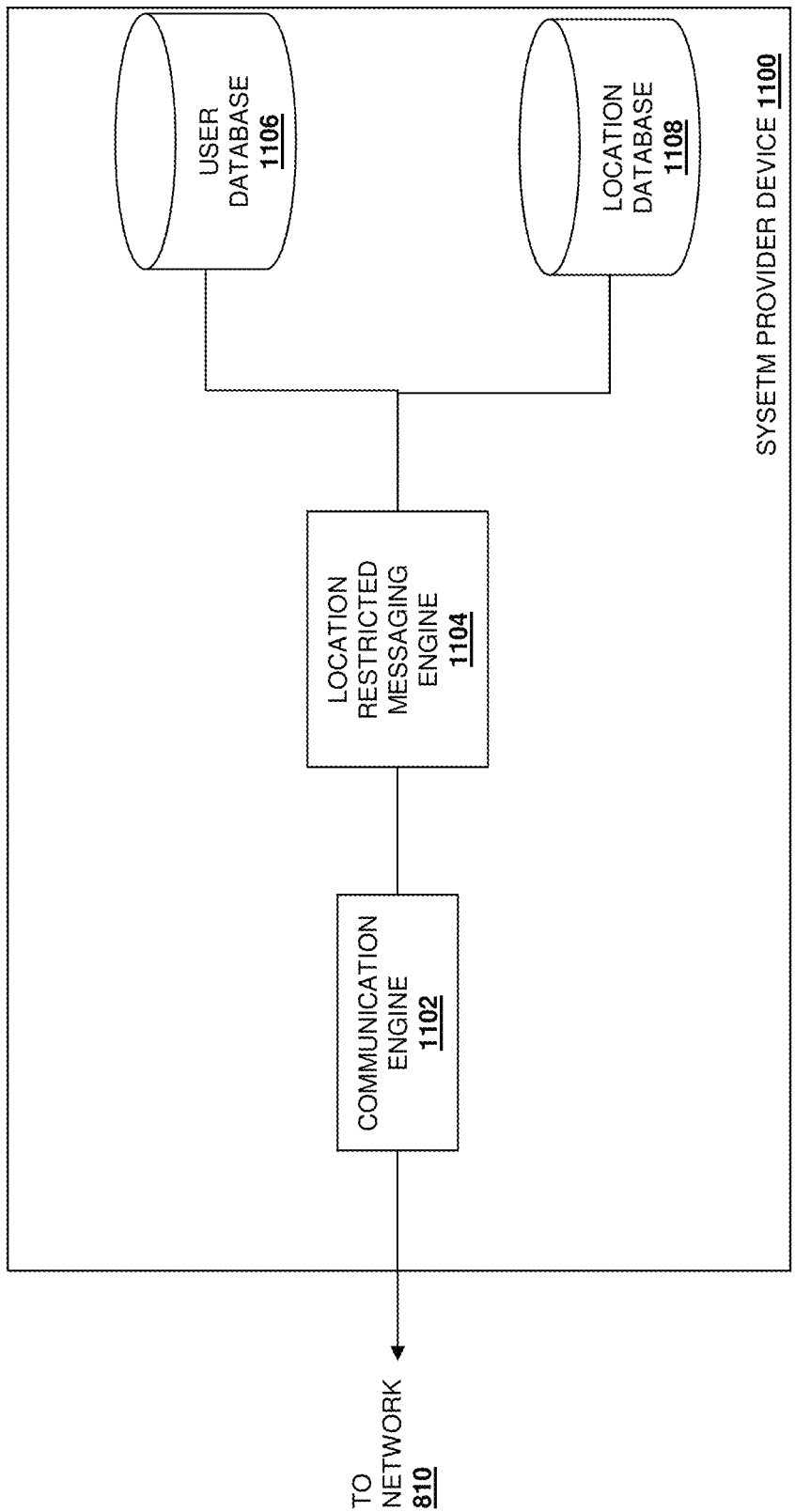
FIG. 11 is a schematic view illustrating an embodiment of a system provider device.

Referring now to FIG. 11, an embodiment of a system provider device 1100 is illustrated. In an embodiment, the device 1100 may be any of the system provider devices discussed above. The device 1100 includes a communication engine 102 that is coupled to the network 810 and to location restricted messaging engine 1104 that is coupled to a user database 1106 and a location database 1108. The communication engine 102 may be software or instructions stored on a computer-readable medium that allows the device 100 to send and receive information over the network 810. The location restricted messaging engine 1104 may be software or instructions stored on a computer-readable medium that is operable to receive sender messages and first location information from sender user devices, receive second location information from receiver user devices, determine that the first location and the second locations are within a limited geographic message exchange area stored in the location database 1108, apply filtering criteria to sender messages, send sender messages to receiver devices, receive response messages from receiver user devices, apply filtering criteria to response messages, send response messages to receiver devices, and provide any of the other functionality that is discussed above. While the databases 1106 and 1108 have been illustrated as located in the system provider device 1100, one of skill in the art will recognize that it may be connected to the location restricted messaging engine 1104 through the network 810 without departing from the scope of the present disclosure.

Where applicable, various embodiments provided by the present disclosure may be implemented using hardware, software, or combinations of hardware and software. Also, where applicable, the various hardware components and/or software components set forth herein may be combined into composite components comprising software, hardware, and/or both without departing from the scope of the present disclosure. Where applicable, the various hardware components and/or software components set forth herein may be separated into sub-components comprising software, hardware, or both without departing from the scope of the present disclosure. In addition, where applicable, it is contemplated that software components may be implemented as hardware components and vice-versa.

Software, in accordance with the present disclosure, such as program code and/or data, may be stored on one or more computer readable mediums. It is also contemplated that software identified herein may be implemented using one or more general purpose or specific purpose computers and/or computer systems, networked and/or otherwise. Where applicable, the ordering of various steps described herein may be changed, combined into composite steps, and/or separated into sub-steps to provide features described herein.

The foregoing disclosure is not intended to limit the present disclosure to the precise forms or particular fields of use disclosed. As such, it is contemplated that various alternate embodiments and/or modifications to the present disclosure, whether explicitly described or implied herein, are possible in light of the disclosure. For example, the above embodiments have focused on merchants and users; however, a user or consumer can pay, or otherwise interact with any type of recipient, including charities and individuals. The payment does not have to involve a purchase, but may be a loan, a charitable contribution, a gift, etc. Thus, payee as used herein can also include charities, individuals, and any other entity or person receiving a payment from a payer. Having thus described embodiments of the present disclosure, persons of ordinary skill in the art will recognize that changes may be made in form and detail without departing from the scope of the present disclosure. Thus, the present disclosure is limited only by the claims.

What is claimed is:

1. A location-restricted messaging system, comprising:
    a non-transitory memory; and
    one or more hardware processors coupled to the non-transitory memory and configured to execute instructions stored in the non-transitory memory to cause the system to perform operations comprising:
        receiving, through a network from a sender device of a sender that is located in a message exchange area, a location-restricted message that includes sender-generated content and a sender device location;
        determining, via communications through the network with a receiver device of a receiver who has no specific predefined relationship with the sender, a receiver device location that is located in the message exchange area;
        wirelessly transmitting, through the network in response to determining the receiver device location is located in the message exchange area, data to the receiver device, the data causing a display of a graphical user interface on the receiver device to show information including:
            the sender-generated content,
            a graphical representation of the message exchange area; and
            an indicator of the sender device location for the sender device that is located within the message exchange area on the graphical representation of the message exchange area;
        receiving, through the network from the receiver device, receiver-generated content; and
        wirelessly transmitting, through the network to the sender device, the receiver-generated content and the receiver device location.

2. The location-restricted messaging system of claim 1, wherein the operations further comprise:
    retrieving sender filtering criteria defined by the sender that is associated with the sender device; and
    identifying, based on the sender filtering criteria, the receiver as a qualified recipient of the location-restricted message, wherein the wirelessly transmitting the data to the receiver device is based on the receiver device location being within the message exchange area and the receiver being the qualified recipient of the location-restricted message.

3. The location-restricted messaging system of claim 1, wherein the operations further comprise:
    retrieving receiver filtering criteria defined by the receiver; and
    identifying, based on the receiver filtering criteria, the receiver as a qualified recipient of the location-restricted message, wherein the wirelessly transmitting the data to the receiver device is based on the receiver device location being within the message exchange area and the receiver being the qualified recipient of the location-restricted message.

4. The location-restricted messaging system of claim 1, wherein the operations further comprise:
    retrieving system provider filtering criteria defined by a system provider that is different from the sender and the receiver; and
    identifying, based on the system provider filtering criteria, the receiver as a qualified recipient of the location-restricted message, wherein the wirelessly transmitting the data to the receiver device is based on the receiver device location being within the message exchange area and the receiver being the qualified recipient of the location-restricted message.

5. The location-restricted messaging system of claim 1, wherein the sender-generated content includes at least one of: an image captured by the sender device, a video captured by the sender device, or a text message input using the sender device.

6. The location-restricted messaging system of claim 1, wherein the indicator indicates the sender device location as a sub-area within the message exchange area, and wherein the operations further comprise:
    receiving, from the receiver device through the network, a selection of the indicator; and
    providing a subsequent indicator that indicates the sender device location within the sub-area of the message exchange area.

7. A method for exchanging location-restricted messages, comprising:
    receiving, by a system provider device through a network from a sender device of a sender that is located in a message exchange area, a location-restricted message that includes sender message information, and a first sender location of the sender device that is within the message exchange area;
    determining, by the system provider device via communications through the network with a plurality of receiver devices of a plurality of receivers, respective first receiver locations of each of the plurality of receiver devices that are within the message exchange area, wherein at least one of the receivers has no specific predefined relationship with the sender;
    wirelessly transmitting, by the system provider device through the network to each of the plurality of receiver devices and based on the respective first receiver locations being within the message exchange area, data that causes a display of a graphical user interface on each of the plurality of receiver devices to show information including:
        the sender message information;
        a graphical representation of the message exchange area; and
        a sender location indicator for the sender device that is located within the message exchange area on the graphical representation of the message exchange area and that indicates the first sender location relative to the message exchange area;
    receiving, by the system provider through the network from at least one receiver device of the plurality of receiver devices, receiver-generated content; and
    wirelessly transmitting, by the system provider through the network to the sender device, the receiver-generated content and the first receiver location of the at least one receiver device.

8. The method of claim 7, further comprising:
retrieving, by the system provider device, sender filtering criteria defined by the sender; and
identifying, based on the sender filtering criteria, respective receivers of the plurality of receivers as qualified recipients of the location-restricted message, wherein the data is wirelessly transmitted based on the respective first receiver locations being within the message exchange area and the respective receivers being qualified recipients of the location-restricted message.

9. The method of claim 7, further comprising:
retrieving, by the system provider device, receiver filtering criteria defined by respective receivers of the plurality of receivers; and
identifying, based on the receiver filtering criteria, the respective receivers as qualified recipients of the location-restricted message, wherein the data is wirelessly transmitted based on the respective first receiver locations being within the message exchange area and the respective receiver being a qualified recipient of the location-restricted message.

10. The method of claim 7, further comprising:
retrieving, by the system provider device, system provider filtering criteria defined by a system provider that is associated with the system provider device and that is different from the sender and the plurality of receivers; and
identifying, based on the system provider filtering criteria, respective receivers of the plurality of receivers as qualified recipients of the location-restricted message, wherein the data is wirelessly transmitted based on the respective first receiver locations being within the message exchange area and the respective receivers being a qualified recipient of the location-restricted message.

11. The method of claim 7, further comprising:
receiving, by the system provider device through the network from a first receiver device of the plurality of receiver devices, a location-restricted message reply that includes a second receiver location of the first receiver device that is within the message exchange area;
determining, by the system provider device through the network via communications with the sender device, a second sender location of the sender device that is within the message exchange area; and
wirelessly transmitting, by the system provider device through the network for display on the sender device and based on the second sender location being within the message exchange area, the location-restricted message reply.

12. The method of claim 7, wherein the sender location indicator is a first sender location indicator that indicates the first sender location as a sub-area within the message exchange area, and wherein the method further comprises:
receiving, by the system provider device through the network from a first receiver device of the plurality of receiver devices, a selection of the first sender location indicator; and
providing, by the system provider device via the graphical user interface displayed on the first receiver device, a second sender location indicator that indicates a second sender location within the sub-area of the message exchange area.

13. The method of claim 7, wherein the sender message information comprises sender-generated content.

14. A non-transitory, machine-readable medium having stored thereon machine-readable instructions executable to cause a machine to perform operations comprising:
receiving, through a network from a sender device of a sender that is located in a message exchange area, a location-restricted message comprising a first sender location of the sender device that is within the message exchange area;
determining, via communications through the network with a receiver device of a receiver who has no specific predefined relationship with the sender, a first receiver location of the receiver device that is within the message exchange area;
wirelessly transmitting, through the network for display on the receiver device and based on the first receiver location being within the message exchange area, data that causes a display of a graphical user interface on the receiver device that shows information including:
a graphical representation of the message exchange area; and
a sender location indicator for the sender device that is located within the message exchange area on the graphical representation of the message exchange area and that indicates the first sender location relative to the message exchange area;
receiving, through the network from the receiver device, receiver-generated content; and
wirelessly transmitting, through the network to the sender device, the receiver-generated content and the receiver device location.

15. The non-transitory, machine-readable medium of claim 14, wherein the operations further comprise:
retrieving sender filtering criteria defined by the sender that is associated with the sender device; and
identifying, based on the sender filtering criteria, the receiver as a qualified recipient of the location-restricted message, wherein the data is wirelessly transmitted based on the first receiver location being within the message exchange area and the receiver being the qualified recipient of the location-restricted message.

16. The non-transitory, machine-readable medium of claim 14, wherein the operations further comprise:
retrieving receiver filtering criteria defined by the receiver; and
identifying, based on the receiver filtering criteria, the receiver as a qualified recipient of the location-restricted message, wherein the data is wirelessly transmitted based on the first receiver location being within the message exchange area and the receiver being the qualified recipient of the location-restricted message.

17. The non-transitory, machine-readable medium of claim 14, wherein the operations further comprise:
retrieving system provider filtering criteria defined by a system provider that is different from the sender and the receiver; and
identifying, based on the system provider filtering criteria, the receiver as a qualified recipient of the location-restricted message, wherein the data is wirelessly transmitted based on the first receiver location being within the message exchange area and the receiver being a qualified recipient of the location-restricted message.

18. The non-transitory, machine-readable medium of claim 14, wherein the operations further comprise:
receiving, through the network from the receiver device, a location-restricted message reply that includes a second receiver location of the receiver device that is within the message exchange area;

determining, through the network via communications with the sender device, a second sender location of the sender device that is within the message exchange area; and wirelessly transmitting, through the network for display on the sender device and based on the second sender location being within the message exchange area, the location-restricted message reply.

19. The non-transitory, machine-readable medium of claim 14, wherein the sender location indicator is a first sender location indicator that indicates the first sender location as a sub-area within the message exchange area, and wherein the operations further comprise:

receiving, through the network from the receiver device, a selection of the first sender location indicator; and providing, via the graphical user interface, a second sender location indicator that indicates a second sender location within the sub-area of the message exchange area.

20. The non-transitory, machine-readable medium of claim 14, wherein the location-restricted message further comprises sender message information comprising at least one detail about the sender.

\* \* \* \* \*